United States Patent
Okamura et al.

(10) Patent No.: US 7,282,717 B2
(45) Date of Patent: Oct. 16, 2007

(54) X-RAY DETECTOR AND X-RAY EXAMINATION APPARATUS USING IT

(75) Inventors: Masami Okamura, Yokohama (JP); Eiji Oyaizu, Yokohama (JP); Yukihiro Fukuta, Yokohama (JP); Yoshihito Tsutsui, Chigasaki (JP); Masaaki Tamatani, Fujisawa (JP); Mitsushi Ikeda, Yokohama (JP); Hiroshi Onihashi, Otawara (JP); Kenichi Ito, Otawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

(21) Appl. No.: 10/546,865

(22) PCT Filed: Sep. 25, 2003

(86) PCT No.: PCT/JP03/12244

§ 371 (c)(1),
(2), (4) Date: Aug. 25, 2005

(87) PCT Pub. No.: WO2004/077098

PCT Pub. Date: Sep. 10, 2004

(65) Prior Publication Data

US 2006/0065842 A1   Mar. 30, 2006

(30) Foreign Application Priority Data

Feb. 27, 2003   (JP)   ............... 2003-050370

(51) Int. Cl.
 H01L 27/00   (2006.01)
(52) U.S. Cl. ................................. 250/370.09
(58) Field of Classification Search ........... 250/370.09
 See application file for complete search history.

(56) References Cited

U.S. PATENT DOCUMENTS

| 4,525,628 | A | * | 6/1985 | DiBianca et al. | ........... 250/367 |
| 5,381,014 | A |   | 1/1995 | Jeromin et al. | |
| 5,521,387 | A | * | 5/1996 | Riedner et al. | ............. 250/367 |
| 5,640,016 | A | * | 6/1997 | Matsuda et al. | ........ 250/361 R |
| 5,880,472 | A | * | 3/1999 | Polischuk et al. | ..... 250/370.09 |

(Continued)

FOREIGN PATENT DOCUMENTS

EP   0 661 556 A3   7/1995

(Continued)

*Primary Examiner*—David Porta
*Assistant Examiner*—Christine Sung
(74) *Attorney, Agent, or Firm*—Foley & Lardner LLP (57) ABSTRACT

An X-ray detector (5) comprises an X-ray-electric charge conversion film (21) for directly converting into charges an incident X-ray that has passed through a subject (2) and is received, and a charge information reading section (15) for detecting charges produced by the X-ray-electric charge conversion film (21) as image signals. The X-ray-electric charge conversion film (21) consists essentially of a rare-earth compound containing at least one of rare-earth element and at least one of element selected from oxygen, sulfur, selenium and tellurium. The X-ray-electric charge conversion film (21) does not adversely affect human bodies and environment, and is excellent in sensitivity, film-forming feature and the like. Accordingly, the X-ray detector (5) which is provided with the improved X-ray detection sensitivity, detection accuracy and the like with environmental loads and the like decreased can be provided.

34 Claims, 3 Drawing Sheets

U.S. PATENT DOCUMENTS

| | | | |
|---|---|---|---|
| 6,171,643 B1* | 1/2001 | Polischuk et al. | 427/76 |
| 6,384,417 B1* | 5/2002 | Okumura et al. | 250/367 |
| 6,723,995 B2* | 4/2004 | Rougeot | 250/370.11 |
| 6,999,121 B2* | 2/2006 | Endo | 348/297 |
| 2004/0066883 A1* | 4/2004 | Kanai et al. | 378/19 |
| 2004/0120459 A1* | 6/2004 | Crowley et al. | 378/98.6 |
| 2004/0262536 A1* | 12/2004 | Van den Bergh et al. | 350/483.1 |
| 2005/0002490 A1* | 1/2005 | Bergh et al. | 378/98.8 |
| 2006/0054830 A1* | 3/2006 | Oyaizu et al. | 250/370.11 |

FOREIGN PATENT DOCUMENTS

| | | |
|---|---|---|
| JP | 58-137781 A | 8/1983 |
| JP | 06-337330 A | 12/1994 |
| JP | 07-235652 A | 9/1995 |
| JP | 2001-264443 A | 9/2001 |
| JP | 2001-320035 A | 11/2001 |
| JP | 2002-026300 A | 1/2002 |
| JP | 2002-275465 A | 9/2002 |
| JP | 2002-289823 A | 10/2002 |
| JP | 2003-057353 A | 2/2003 |
| JP | 2003-279691 A | 10/2003 |

* cited by examiner

X-RAY DETECTOR AND X-RAY EXAMINATION APPARATUS USING IT

TECHNICAL FIELD

The present invention relates to an X-ray detector used for medical diagnosis, various types of non-destructive inspections and the like and an X-ray examination apparatus using it.

BACKGROUND ART

X-ray photographing is used for medical diagnosis, non-destructive inspection for industrial purpose and the like. An intensifying screen/film method is used generally for the X-ray photographing. The intensifying screen/film method is a method which converts an X-ray passed through a subject into visible light on an intensifying screen and photosensitizes a film by the visible light to obtain an X-ray image. The medical diagnosis and non-destructive inspection are carried out based on the X-ray image formed on the film.

Meanwhile, with the recent advance of digital technology, a method which converts an X-ray image into an electric signal and processes the electric signal into an image so as to examine is now becoming popular. The medical diagnosis and non-destructive inspection are carried out on the basis of a visible image (X-ray image) displayed on a CRT or the like. As a method of examining an X-ray image by digitizing it, there is known a method which uses an X-ray image intensifier (I.I. tube) as an X-ray detector.

The X-ray image intensifier is provided with an input section which converts an X-ray into photoelectrons and an output section which converts the photoelectrons into visible light at both ends of a vacuum envelope. The output visible light image is digitized by a CCD camera or the like. For example, lungs are diagnosed by photographing a region of about 400×400 mm, and to detect an examination image of such a photographed region by the CCD camera sized about one inch, it is necessary to highly collect light within the I.I. tube. Therefore, there are problems that the I.I. tube becomes large in size and the like.

With the advance of the semiconductor processing technology in these years, there is developed a system that X-ray photographing is carried out using semiconductor sensors and semiconductor elements arranged in the form of an array. This type of X-ray imaging system can easily deal with a large photographing region and can directly digitize image data. Therefore, it is suitable for creation of database of X-ray photographed data (image data) in, for example, the medical field. In addition, it has advantages that a dynamic range is large in comparison with that of X-ray photographing systems using a conventional photosensitive film, and image accuracy is hardly affected by a change in X-ray exposure amounts.

In the X-ray imaging system using the semiconductor process technology, a planar X-ray detector with an amorphous silicon thin film transistor (a-Si TFT) in the form of an array applied to a switching gate is used. As the planar X-ray detector, there are known a direct conversion method using an X-ray-electric charge conversion film to convert an X-ray image directly into electric charge information and an indirect conversion method using a phosphor layer for converting an X-ray image into a light signal and a photoelectric conversion film for converting the light signal into electric charge information.

Sensitivity obtained by the planar X-ray detector of the indirect conversion method is equivalent to or less than that of a photographing system using, for example, the intensifying screen/film method or an X-ray image intensifier. Therefore, the planar X-ray detector of the direct conversion method which can provide high sensitivity is watched with interest in these years. For the planar X-ray detector of the direct conversion method, it is considered to use a material such as a-Se, $PbI_2$, $HgI_2$ or the like for the X-ray-electric charge conversion film (see Japanese Patent Laid-Open Applications Nos. 2001-264443 and 2001-320035).

$PbI_2$ and $HgI_2$ in the constituent materials of the above-described X-ray-electric charge conversion film are worried that Pb and Hg exert an adverse effect on human bodies and environments and, therefore, it is demanded to decrease the use of them in various fields. Even Se is worried that it exerts an adverse effect on human bodies and environments if it is contained in a large amount. In addition, it is necessary to form the X-ray-electric charge conversion film uniformly in order to obtain an accurate image by the planar X-ray detector. But, the conventional X-ray-electric charge conversion film materials such as Se, $PbI_2$, $HgI_2$ and the like are hardly formed into a uniform film. Therefore, the conventional planar X-ray detector of the direct conversion method has a problem that the image accuracy drops because of the film accuracy and film characteristics of the X-ray-electric charge conversion film.

As described above, the planar X-ray detector of the direct conversion method attracts attention because it provides high sensitivity. However, the X-ray-electric charge conversion film material used for the conventional planar X-ray detector is demanded that its use is decreased because it has an adverse effect on human bodies and environments and has a problem that a uniform film cannot be formed from it. Degradation of the film accuracy of the X-ray-electric charge conversion film degrades the image accuracy of the planar X-ray detector. Therefore, it is demanded that the X-ray-electric charge conversion film can be formed uniformly by using a material which does not affect adversely on human bodies and environments.

The present invention has been made in view of the above circumstances and provides an X-ray detector and an X-ray examination apparatus using it, by applying materials, which do not exert an adverse effect on human beings and environments and provide a uniform film with ease, to the X-ray-electric charge conversion film, to decrease environmental loads and the like and also to improve the X-ray detection sensitivity, detection accuracy and the like.

SUMMARY OF THE INVENTION

An X-ray detector according to an embodiment of the present invention comprises an X-ray-electric charge conversion film which directly converts an incident X-ray into an electric charge and consists essentially of a rare earth compound containing at least one of rare earth element, and at least one of element selected from oxygen, sulfur, selenium and tellurium; and a charge information reading section which has plural pixels in contact with the X-ray-electric charge conversion film and reads the electric charge generated in the X-ray-electric charge conversion film as an image signal for each of the plural pixels.

An X-ray examination apparatus according to an embodiment of the present invention comprises an X-ray source which emits an X-ray to a subject and the above-described X-ray detector of the present invention which detects the X-ray passed through the subject as an image signal.

According to the present invention, a rare earth compound containing at least one of rare earth element R and at least one of element Z selected from oxygen, sulfur, selenium and tellurium is applied to the X-ray-electric charge conversion film. The above rare earth compound has a function to directly convert an X-ray into an electric charge, and the X-ray-electric charge conversion film can be made highly sensitive on the basis of the R element having a high X-ray absorption coefficient. Besides, the rare earth compound can be formed into a uniform film with ease in comparison with a conventional X-ray-electric charge conversion film material, so that image accuracy can be improved. In addition, it is free from a possibility of adversely affecting upon human bodies and environments as the conventional X-ray-electric charge conversion film material does. Therefore, the detection sensitivity, detection accuracy and the like of the X-ray detector can be improved while environmental loads and the like are reduced.

BEST MODE FOR IMPLEMENTING THE INVENTION

Modes of carrying out the present invention will be described.

Figure 1:
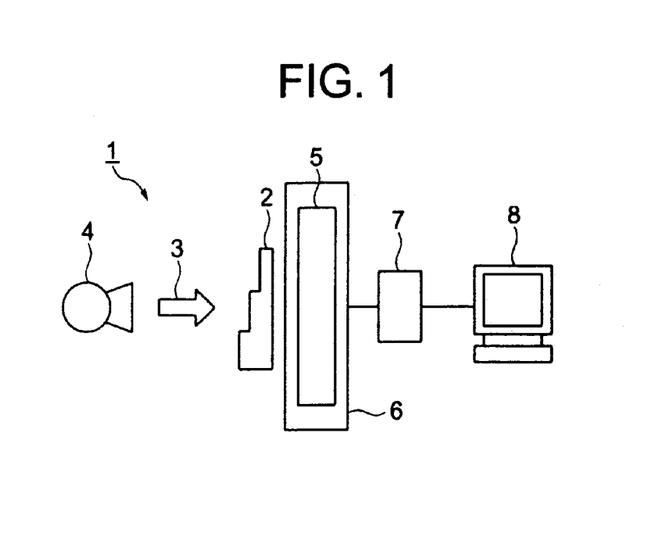
FIG. 1 is a view schematically showing a structure of one embodiment of an X-ray examination apparatus to which the X-ray detector of the present invention is applied.

FIG. 1 is a view schematically showing a structure of one embodiment of an X-ray examination apparatus 1 to which the X-ray detector of the present invention is applied. The X-ray examination apparatus 1 shown in FIG. 1 has an X-ray source 4 such as an X-ray tube or the like which emits an X-ray 3 to a subject 2 such as a human body, an animal and a variety of articles. The X-ray 3 which is absorbed or scattered by the subject 2 is emitted to an X-ray imaging device 6 which has a planar X-ray detector 5 therein. In the planar X-ray detector 5, X-ray information is detected as an image signal. The image signal output from the X-ray imaging device 6 is digitally processed by a signal processing section 7 and displayed as an X-ray image (examination image) on a monitor (display section) 8 such as a CRT.

Figure 2:
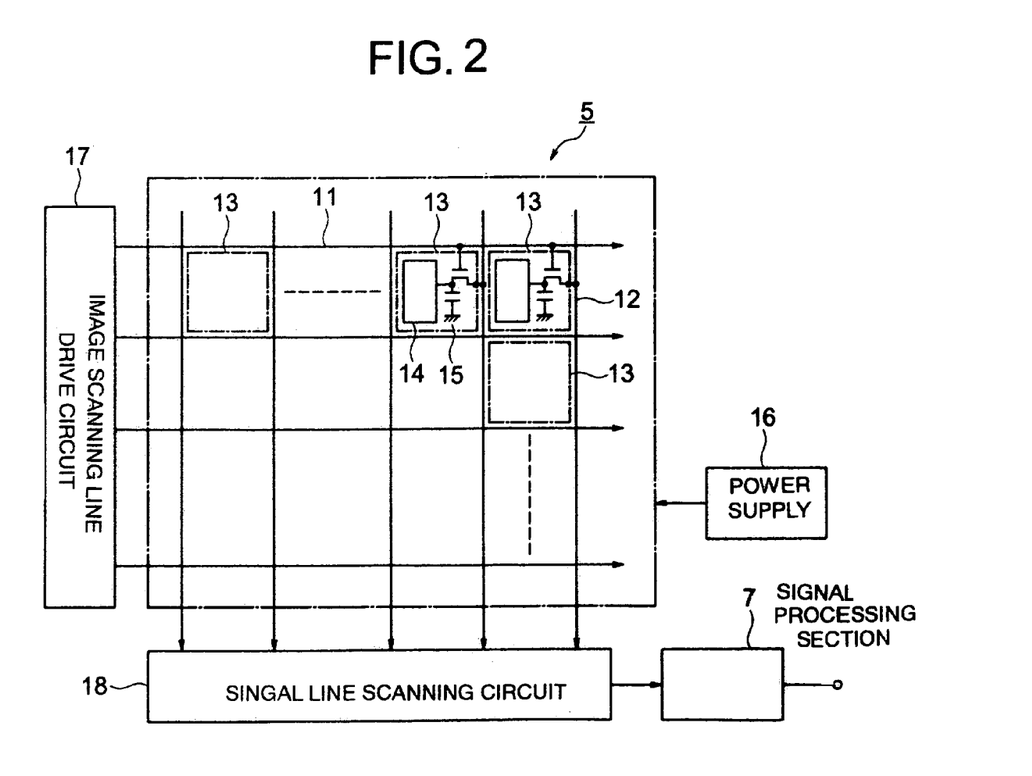
FIG. 2 is a circuit diagram showing an outline structure of the X-ray detector shown in FIG. 1.
Figure 3:
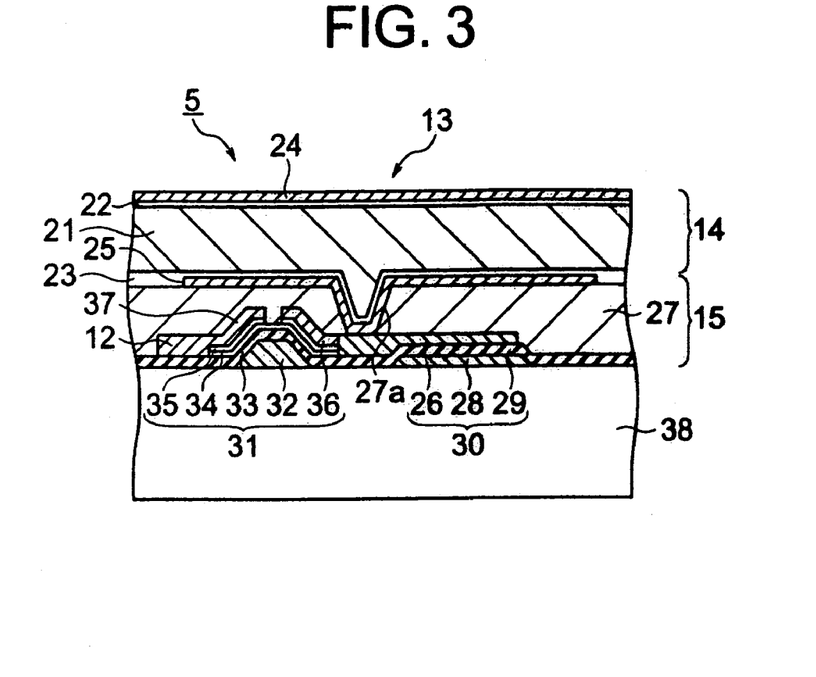
FIG. 3 is a sectional view showing a main portion of the X-ray detector shown in FIG. 2.

For example, as shown in FIG. 2 and FIG. 3, the planar X-ray detector 5 has plural scanning (gate) lines 11 and signal lines 12, which are arranged in an X-Y matrix fashion with a prescribed pitch, and has a conversion cell 13 formed as a pixel within individual regions formed by the intersecting lines 11, 12. These conversion cells 13 have an X-ray-electric charge conversion section 14 which generates an electric charge according to the emitted X-ray intensity and a charge information reading section 15 which reads the generated electric charge as an electric signal (image signal), and a prescribed high voltage is applied from a power supply 16.

FIG. 2 is a conceptual view showing that the X-ray-electric charge conversion section 14 covers only a partial region of the conversion cells 13, but substantially the whole surface of the X-ray emitted surface is determined as the X-ray-electric charge conversion section 14 in practice.

The individual image scanning lines 11 are sequentially supplied with a scanning signal from an image scanning line drive circuit 17. And, the electric charge generated by the X-ray-electric charge conversion section 14 is read by the charge information reading section 15 which is connected to the image scanning lines 11 to which the scanning signal is supplied. The read electric charge is led to a signal line scanning circuit 18 through the corresponding signal lines 12. The image signals led through the individual signal lines 12 are sequentially read for the individual conversion cells 13 in the signal line scanning circuit 18, subjected to analog-digital conversion by the latter-stage signal processing section 7 and sent as a digital signal to the display section 8.

The X-ray-electric charge conversion section 14 has an X-ray-electric charge conversion film 21 as shown in the sectional view of FIG. 3 mainly showing the conversion cell 13. An electron transport layer 22 and a hole transport layer 23 are respectively formed on the top and bottom of the X-ray-electric charge conversion film 21. A common electrode 24 is formed on the electron transport layer 22 and applies a bias voltage which is a high voltage to the X-ray-electric charge conversion film 21. The charge information reading section 15 is disposed to come in contact with the X-ray-electric charge conversion film 21 of the individual conversion cells (pixels) 13.

The individual conversion cells (pixels) 13 which are arranged in the form of an array have a pixel electrode 25 which is formed on the side of the X-ray-electric charge conversion film 21. The pixel electrode 25 is electrically connected to an auxiliary electrode 26 via a contact hole 27a which is formed in an insulation layer 27. An electric charge storage capacitor 30 is comprised of the auxiliary electrode 26, a capacitor electrode 28 and an insulation film 29 which is disposed between them. The individual conversion cells 13 have a switching element 31 which is disposed in correspondence with the electric charge storage capacitor 30 and formed of, for example, an amorphous silicon thin film transistor (a-Si TFT).

The switching element (switching TFT 31) is configured by having a gate electrode 32 which is electrically connected to the image scanning line 11 for sending a drive signal, an insulation film 33 for gate insulation, an undoped a-Si layer 34 which is used as an active layer, and an $n^+$ a-Si layer 35 for contact, a source electrode 36 which is electrically connected to the auxiliary electrode 27 and a drain electrode 37 which is connected to the signal lines 12 laminated sequentially on, for example, a glass substrate 38. The planar X-ray detector 5 is provided with a TFT array which has the above switching TFT 31 formed in the form of an array.

In the planar X-ray detector 5, the X-ray passed through the subject 2 is emitted to the X-ray-electric charge conversion film 21. An electric charge is directly generated in the X-ray-electric charge conversion film 21 depending on energy intensity of the incident X-ray. The electric charge to be generated is a pair of electrons and holes and separated by a high electric field applied between the electrodes 24 and 25, and the electrons and the holes are attracted by the electrode 24 or the electrode 25. The electric charge which is attracted by the pixel electrode 25 is accumulated in the electric charge storage capacitor 30 through the auxiliary electrode 27. Specifically, electric charge corresponding to the X-ray energy is accumulated in the electric charge storage capacitor 30.

The accumulated electric charge is led to the signal line scanning circuit 18 through the signal lines 16 when the switching TFT 31 is turned on. And, on/off of the switching TFT 31 is controlled to send the electric charge for each pixel 13 to the signal line scanning circuit 18, so that image information of the X-ray image is sequentially converted into the next signal. This image signal is digitally processed by the signal processing section 7, sent to the monitor 8 such as a CRT and displayed as an X-ray image (examination image).

The above-described X-ray-electric charge conversion film 21 of the planar X-ray detector 5 is comprised of a rare earth compound containing at least one kind of rare earth element R and at least one kind of Z element selected from the group consisting of oxygen (O), sulfur (S), selenium (Se) and tellurium (Te). The rare earth compound as a material configuring the X-ray-electric charge conversion film 21 advisably contains the rare earth element R and the above-described 6B family element Z as essential elements and may also be a compound containing another element M. Specifically, the rare earth compound is not limited to an $RZ_x$ compound (x represents an arbitrary number) but may be, for example, an $RM_yZ_x$ compound (where, M represents at least one of element capable of forming a complex compound with the R element and the Z element, and x and y represent an arbitrary number) such as $R_2SiO_5$ or $R_2AlO_5$.

In the rare earth compound configuring the X-ray-electric charge conversion film 21, the rare earth element R is an element which contributes to enlargement of the X-ray absorption coefficient. A lanthanoid element including Y is applied to the rare earth element R, Eu, Gd, Tb, Dy, Ho, Er, Tm, Yb and Lu having a large atomic weight have a large X-ray absorption coefficient and are preferable for the rare earth compound configuring the X-ray-electric charge conversion film 21. Meanwhile, inexpensive rare earth elements such as La, Ce, Pr, Nd, Sm and the like are desirable from an industrial point of view. Particularly preferable rare earth elements R are Gd, Eu, Tb and Lu, and Gd is optimum among them.

The Z element (at least one kind of 6B family element selected from O, S, Se and Te) is an element which is in chemical combination with the above-described rare earth element R to form an insulator or a semiconductor. Generally, when an insulator or a semiconductor having a band gap absorbs electromagnetic waves of the X-ray or the like having energy of the band gap or more, an electron-hole pair is formed, and it can be taken out as an electric signal. Specifically, the rare earth compound containing the Z element as a compound producing element has a function as the X-ray-electric charge conversion film 21 which converts directly the X-ray into an electric charge.

The rare earth compound may be a compound containing at least one kind of Z element, namely oxide, sulfide, selenide, telluride, oxysulfide, oxyselenide, oxytelluride or the like. Among them, oxide, sulfide and oxysulfide are preferably used from a view point of handling, X-ray absorbed amount and the like. And, the Z element may be partly substituted by another element M such as Si, Al, Ge, Ga, Sn, In, P, B, transition metal element or the like. Among the compounds containing the M element, a silicate, an aluminate, a phosphate and a borate are preferable compounds.

Specific examples of the rare earth compound include a rare earth oxide represented by $R_2O_3$ or the like, a rare earth sulfide represented by $R_2S_3$, RS or the like, a rare earth selenide represented by $R_2Se_3$, RSe or the like, a rare earth telluride represented by $R_2Te_3$, RTe or the like, a rare earth oxysulfide represented by $R_2O_2S$ or the like, a rare earth oxyselenide represented by $R_2O_2Se$ or the like, a rare earth oxytelluride represented by $R_2O_2Te$ or the like, a rare earth silicate represented by $R_2SiO_5$, $R_2Si_2O_7$ or the like, a rare earth aluminate represented by $RAlO_3$, $R_2AlO_5$ or the like, a rare earth phosphate represented by $RPO_4$ or the like, and a rare earth borate represented by $RBO_3$ or the like.

Among the above rare earth compounds, the above-described rare earth oxide, rare earth sulfide, and rare earth oxysulfide are preferably used, and the rare earth oxide and rare earth oxysulfide are used more preferably. The rare earth compound is not limited to a compound at a stoichiometric composition ratio but may have a composition ratio somewhat deviated from the stoichiometric composition ratio. For example, the electric resistivity, band gap and the like can be adjusted by partially omitting the Z element such as oxygen or sulfur, so that a compound suitable for the X-ray-electric charge conversion film 21 might be obtained.

Incidentally, the planar X-ray detector 5 can be made to have a high S/N ratio as electric current (dark current) flowing with the X-ray not emitted with a high voltage applied between the electrodes is smaller in the planar X-ray detector 5. In this connection, the number of electrons (number of holes) which is thermally excited from the valence band to the conduction band decreases as the constituent material of the X-ray-electric charge conversion film 21 has a larger band gap, and the dark current due to the electrons (holes) drops. But, the electron-hole pair is easily formed as the band gap of the constituent material is smaller, and sensitivity to the X-ray can be enhanced accordingly.

Considering what are described above, it is desirable to use a rare earth compound having a band gap in a range of 1.7 to 6.0 eV for the constituent material of the X-ray-electric charge conversion film 21. The band gap of the rare earth compound is desirably in a range of 2.0 to 5.6 eV, and more desirably in a range of 2.1 to 4.0 eV. An example of the band gap is 2.6 eV for $Gd_2S_3$, 5.3 eV for $Gd_2O_3$, 4.1 eV for $Tb_2O_3$ and 1.65 (about 1.7) eV for $La_2Se_3$. In conventional X-ray-electric charge conversion film materials, $PbI_2$ has a band gap of 2.3 eV, and a-Se has a band gap of 2.3 eV, too.

Besides, to realize the X-ray-electric charge conversion film 21 having small dark current, it is desirable to control the electric resistivity of the material configuring the X-ray-electric charge conversion film 21 to an appropriate range. If the electric resistivity of the X-ray-electric charge conversion film 21 is excessively small, the dark current becomes large. Meanwhile, if the electric resistivity is excessively large, it becomes difficult to conduct the electrons (holes) generated by the emission of the X-ray to the electrode. Accordingly, the X-ray-electric charge conversion film 21 desirably has the electric resistivity in a range of $10^8$ to $10^{15}$ $\Omega \cdot m$. The X-ray-electric charge conversion film 21 desirably has the electric resistivity in a range of $10^9$ to $10^{14}$ $\Omega \cdot m$, and more desirably in a range of $10^9$ to $10^{13}$ $\Omega \cdot m$.

In the above-described rare earth compound ($RZ_x$ compound, $RM_yZ_x$ compound or the like), impurities or defects in crystals cause dark current to flow depending on electrons (holes) supplied to the conduction band (valence band) or dark current to flow depending on the electrons (holes) which causes hopping of an impurity level or a defect level. It is presumed that the impurities which cause the above dark current are P, F, Cl, Na, K and the like. But, when such elements are components configuring the rare earth compound, they are not assumed as impurities. Not all of the elements exert an effect on the dark current, but elements which have an influence are variable depending on the compound of the subject parent body.

Accordingly, the rare earth compound configuring the X-ray-electric charge conversion film 21 is desired that the contents of the above-described impurity elements are 5000 ppm (mass) or less. Especially, P, F and Cl have a large influence, so that the contents of these elements are desirably 3000 ppm (mass) or less, respectively. The contents of these elements are more desirably 1000 ppm (mass) or less, respectively. The total content of the impurity elements is desirably 2% by mass or less. And, it is possible to decrease the defects by thermally treating. It is desirable that the thermal treatment conditions are determined appropriately depending on the compositions of the rare earth compound and production methods.

The X-ray-electric charge conversion film 21 formed of the rare earth compound desirably has a thickness in a range of 0.05 to 4 mm. If the X-ray-electric charge conversion film 21 has a thickness of less than 0.05 mm, the X-ray absorption becomes insufficient, and the sensitivity of the planar X-ray detector 5 lowers. Meanwhile, if the X-ray-electric charge conversion film 21 has a thickness of more than 4 mm, a voltage for applying a necessary electric field to the film becomes excessively high, and it is not desirable industrially. Besides, if the film thickness exceeds 4 mm, the electric charge generated in the film by absorbing the X-ray has a long distance of traveling to the electrode along the electric field applied from the outside. Therefore, the probability of disappearance of the electric charge becomes high as a result of recombination of the electrons and the holes or the capture by the defects. In other words, the sensitivity of the X-ray-electric charge conversion film 21 becomes low. The thickness of the X-ray-electric charge conversion film 21 is more desirably in a range of 0.1 to 2 mm, and most desirably in a range of 0.2 to 1.5 mm.

A rare earth compound ($RZ_x$ compound, $RM_yZ_x$ compound or the like) containing at least R element and Z element has a function as the X-ray-electric charge conversion film 21 to directly convert the X-ray into an electric charge and makes it possible to provide the X-ray-electric charge conversion film 21 with high sensitivity on the basis of the R element having a high X-ray absorption coefficient. Besides, the rare earth compound is easily formed into a uniform film in comparison with conventional X-ray-electric charge conversion film material such as Se, $PbI_2$, $HgI_2$ or the like, so that image accuracy can be improved. In addition, it has no possibility of adversely affecting on human bodies or environments in comparison with the conventional X-ray-electric charge conversion film material. Therefore, the X-ray-electric charge conversion film 21 excelling in detection sensitivity, detection accuracy and the like can be obtained while decreasing environmental loads or the like.

A method of forming the X-ray-electric charge conversion film 21 of the rare earth compound is not limited to a particular one, and the X-ray-electric charge conversion film 21 can be produced by applying various types of film forming methods. For example, the X-ray-electric charge conversion film 21 of the rare earth compound can be formed by applying various kinds of film forming methods such as a method of slicing after sintering as ceramics (sintering method), a method of forming a sheet or a film by mixing rare earth compound powder with a binder component (forming method), a sputtering method, and a deposition method.

As the deposition method, an electron beam deposition method, a multiple deposition method, or the like is suitable. The sintering method and the forming method have advantages that mass productivity can be enhanced by producing a large sintered body or sheet and cutting it into a necessary size to produce many at the same time and that a large (vertical and horizontal sizes) X-ray-electric charge conversion film can be formed. For example, the sputtering method cannot form a film at a time unless a target having a size not smaller than the X-ray-electric charge conversion film is used for sputtering. Therefore, there is a probability that homogeneousness and the like of the X-ray-electric charge conversion film are degraded.

When the sintering method is applied to form the X-ray-electric charge conversion film 21, raw material powder is produced by a coprecipitation method, a solid-phase reaction method, a gas-phase reaction method of various types of gases and solids, or the like. The raw material power is sintered at a temperature suitable for the material. The particle diameter, composition, uniformity, internal defect and the like of the rare earth compound can be adjusted by controlling the conditions for sintering. A method of forming the X-ray-electric charge conversion film 21 by applying the sintering method will be described specifically with reference to rare earth oxysulfide as an example.

First, the rare earth oxide produced by the coprecipitation method or the like is used as a starting material. This rare earth oxide powder is sufficiently mixed with an sulfurizing agent such as sulfur (S) powder and flux such as $A_3PO_4$ or $A_2CO_3$ (A represents at least one kind of element selected from Li, Na, K, Rb and Cs). The obtained powder mixture is calcined at a temperature in a range of 1100 to 1300° C. for 5 to 10 hours and washed with an acid and water to obtain rare earth oxysulfide powder.

The obtained powder is used as raw material powder for ceramics (sintered body). The raw material powder desirably has an average particle diameter in a range of 1 to 20 μm. If the average particle diameter of the raw material powder is less than 1 μm, a filling rate is decreased at a stage of, for example, rubber press forming. Therefore, contraction becomes large by a HIP process for carrying out high-temperature compression, and a possibility of breakage due to an increase in the contraction of a metallic capsule becomes high. Meanwhile, if the average particle diameter of the raw material powder exceeds 20 μm, it becomes necessary to have a higher temperature at the time of the HIP process, resulting in having a tendency to degrade the strength, sensitivity, sensitivity distribution or the like. It is further desirable that the raw material powder has an average particle diameter in a range of 3 to 10 μm.

The above-described raw material powder is formed into a desired shape by a rubber press, and the formed body is charged in a metallic vessel or the like and subjected to the HIP process. The HIP temperature is variable depending on the target material but determined to fall in an appropriate temperature range. Generally, if the HIP temperature is excessively lower than the appropriate temperature range, the crystal grain growth becomes insufficient, and conductivity of the electric charge generated by the X-ray is degraded. Meanwhile, if the HIP temperature is excessively high, the crystal grain growth proceeds rapidly, and crystal defects increase to cause trapping of an electric charge.

Where the rare earth oxysulfide is used, the HIP temperature is desirably in a range of 1400 to 1600° C. It is more desirable that the HIP temperature is in a range of 1450 to 1550° C. And, a HIP pressure is desirably 98 MPa or more. If the HIP pressure is less than 98 MPa, a satisfactory HIP effect can not be obtained. A HIP time is preferably in a range of 5 to 7 hours, though variable depending on the HIP temperature and HIP pressure, when the HIP temperature is 1400 to 1600° C., and the HIP pressure is 98 MPa or more. By carrying out the HIP process to the rare earth oxysulfide powder under such conditions, good ceramics (sintered body) can be obtained with good reproducibility.

According to a manufacturing process of ceramics (sintered body) where the aforementioned HIP process is applied, a high-density sintered body of the rare earth oxysulfide can be obtained. The obtained sintered body is machined into a prescribed shape by applying, for example, a dicing process, and further heat-treating in an inert gas atmosphere. Thus, an X-ray-electric charge conversion film of ceramics can be obtained. The HIP process can also be applied to a rare earth compound other than the rare earth oxysulfide to obtain high-density ceramics (sintered body). But, a high-density sintered body can be obtained by a hot pressing method, an atmosphere-pressure-sintering method or the like depending on kinds of rare earth compounds. Therefore, the obtained sintered body may be used.

To form a sheet or film by mixing the rare earth compound powder with a binder component, for example, a production method shown below can be applied. A shaped body of the rare earth compound can be formed as, for example, a coated film on a support or a sole sheet. A sheet shaped body can also be formed by peeling a film coated onto the support.

As the support which is used to form a sheet or film shaped body, for example, resins such as cellulose acetate, cellulose propionate, cellulose acetate butyrate, polyester such as polyethylene terephthalate, polystyrene, polymethacrylate, polyamide, vinyl chloride-vinyl acetate copolymer, polycarbonate or the like are formed in film to use, or paper or an aluminum plate is used.

The rare earth compound powder is mixed with a binder (binding agent) and a solvent and, if necessary, a dispersant, a plasticizing agent or the like, to prepare a rare earth compound-containing compound or slurry (coating liquid). The rare earth compound-containing compound is formed into a sheet by applying, for example, a pressing method. Where the rare earth compound slurry is used, a doctor blade method, a squeegee method, a spin coat method, a knife coating method or the like is applied to produce a film or sheet shaped body. The sheet or film shaped body is heated as required to volatilize and dry the binder, the solvent or the like. After the slurry is directly dried, press molding may be carried out to produce the sheet or plate.

It is desirable that the rare earth compound powder has an average particle diameter in a range of 1 to 20 μm. If the powder has an average particle diameter of less than 1 μm, the filling rate of a sheet or film shaped body drops. Meanwhile, if the powder has an average particle diameter of more than 20 μm, the surface flatness after the sheet or film shaped body is formed degrades, and the spatial resolution of the X-ray-electric charge conversion film 21 degrades. It is further desirable that the rare earth compound powder has an average particle diameter in a range of 2 to 10 μm.

The binders used in production of the sheet or film shaped body are not limited to particular ones but include, for example, epoxy, polyacrylate, polymethacrylate, cellulose acetate, cellulose acetate, ethyl cellulose, polyvinyl butyral, polyvinyl alcohol (PVA), polyvinyl butyral (PVB), methyl cellulose, polyethylene glycol, carboxymethyl cellulose, polyurethane, cellulose acetate butyrate, and the like. As the solvents, acetone, toluene, trichlene, ethyl alcohol, methyl ethyl ether, methyl ethyl ketone, butyl acetate, ethyl acetate, xylene, water and the like are used.

Besides, as the dispersing agent, glycerin triorate, allylsulfonate, phthalic acid, stearic acid, phosphates, various kinds of surfactants and the like are used. As the plasticizing agent, octylphthalate, butyl benzyl phthalate, glycerin, polyethylene glycol, sucrose acetate isobutyrate, dibutylphthalate, diisodecyl phthalate, triphenyl phosphate, diethyl phthalate and the like are used.

The X-ray-electric charge conversion film produced by applying the above-described forming method may be provided with, for example, a protective film having a thickness of about several μm, if necessary. The protective film can be formed of various kinds of resins. Specifically, a resin film of polyethylene terephthalate, polyethylene, polyvinylidene chloride, polyamide or the like is laminated on the X-ray-electric charge conversion film to form the protective film.

A resin such as cellulose derivative such as cellulose acetate, acetyl cellulose, cellulose acetate butyrate or the like, polyvinyl chloride, polyvinyl acetate, vinyl chloride-vinyl acetate copolymer, polycarbonate, polyvinyl butyral, polymethyl methacrylate, polyvinyl formal, polyurethane or the like may be dissolved in a solvent to prepare a protective film coating liquid, which is then coated and dried on the X-ray-electric charge conversion film to form the protective film. Instead of the support, the X-ray-electric charge conversion film may be formed on the protective film. To do so, the support on which an adhesive agent or the like is coated and the X-ray-electric charge conversion film having the protective film are laminated to form the target X-ray-electric charge conversion film.

The X-ray examination apparatus 1 of the above-described embodiment is provided with the planar X-ray detector 5 which has the X-ray-electric charge conversion film 21 which is harmless and high in sensitivity to X-rays and can improve image accuracy and resolution on the basis of film accuracy and the like. Therefore, the image accuracy, resolution and the like of the X-ray photographing for medical diagnosis and non-destructive inspection or the like used for industrial purposes can be improved while reducing environmental loads and the like.

Especially, the planar X-ray detector 5 having a TFT array can easily cope with the X-ray photographing region with a larger area related to, for example, medical diagnosis and provides an effect of digitizing the X-ray image used for medical diagnosis. And, the X-ray image information (examination image information) converted into a digital signal can be stored as database or the like. Therefore, it is also effective for improvement of storage accuracy of, for example, inspection data and sharing of the inspection data by multiple medical institutes.

Accordingly, the X-ray examination apparatus 1 of this embodiment is suitable for the X-ray photographing apparatus for medical diagnosis. But, the planar detector 5 of this embodiment is not limited to the use for the X-ray examination apparatus but may be used as an X-ray area sensor in various kinds of fields. In the above-described embodiment, the example of applying the X-ray detector of the present invention to the planar X-ray detector (with the plural pixels 13 having the switching TFT 31 arranged in the shape of an array) was described, but the X-ray detector of the present invention is not limited to what was described above. The present invention can also be applied to an X-ray detector, which has the plural pixels 13 having the switching TFT 31 arranged in the shape of a line, namely a so-called X-ray line senor and the like.

Then, specific examples of the present invention and their evaluated results will be described.

EXAMPLE 1

$Gd_2O_2S$ powder having an average particle diameter of 10 μm was shaped by a rubber press. The obtained shaped body was sealed in a capsule of Ta and undergone a HIP process. The HIP process was performed with argon gas sealed as a pressure medium under conditions including a pressure of 147 MPa, a temperature of 1500° C. and three hours. Then, the shaped body undergone the HIP process was machined into a thin plate of 30×30×0.5 mm and heat-treated in $N_2$ gas containing a small amount of oxygen and $SO_2$ at a temperature of 1100° C. to obtain a target X-ray-electric charge conversion film (plate). The X-ray-electric charge conversion film of $Gd_2O_2S$ had an electric resistivity of $10^{12}$ Ω·m.

Cr electrodes having a thickness of 1 μm ware formed on surfaces of the X-ray-electric charge conversion film by sputtering. Sensitivity and dark current were measured with a bias voltage of 1 kV applied between those electrodes. The sensitivity was determined from electric current which flew when an X-ray having tube voltage of 70 kV and tube current of 2 mA was emitted. The dark current was determined by measuring electric current without emitting X-ray. The evaluated results are shown in Table 1.

Then, a TFT array substrate was adhered to the above-described X-ray-electric charge conversion film (plate) to form as a common electrode an Al film having a thickness of 0.2 μm. Besides, an image scanning line drive circuit and a signal line scanning circuit were connected to prepare the planar X-ray detector 5 shown in FIG. 2 and FIG. 3. The planar X-ray detector 5 was used to configure the X-ray imaging system shown in FIG. 1. Sensitivity and sharpness at the time of X-ray emission were measured. Their evaluated results are shown in Table 2. The sensitivity and sharpness shown in Table 2 represent relative values determined based on the sensitivity and sharpness of the X-ray imaging system according to Comparative Example 2 described later taken as 100.

EXAMPLES 2 TO 7

X-ray-electric charge conversion films (plates) were produced under the same conditions as those in Example 1 except that the rare earth oxysulfide powders ($Gd_2O_2S$:Tb etc.) shown in Table 1 were used. Those X-ray-electric charge conversion films were measured for their sensitivity and dark current by the same procedure as that in Example 1. Additionally, planar X-ray detectors configured of the obtained X-ray-electric charge conversion films were measured for their properties and evaluated by the same procedures as those in Example 1. The evaluated results are shown in Table 1 and Table 2.

EXAMPLE 8

Ten parts by weight of $Lu_2O_2S$ powder having an average particle diameter of 8 μm were blended with one part by weight of polyvinyl butyral resin as a binder and an appropriate amount of methyl ethyl ketone as an organic solvent. They were mixed homogeneously to prepare a slurry coating liquid. The coating liquid was uniformly coated on a sheet formed of a white polyethylene terephthalate film having a thickness of 250 μm by a knife coater such that the thickness after drying became 0.7 mm. The coated layer was dried to form the X-ray-electric charge conversion film. This $Lu_2O_2S$ X-ray-electric charge conversion film had an electric resistivity of $10^{12}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLES 9 TO 13

Coated film-shaped X-ray-electric charge conversion films were produced under the same conditions as those in Example 8 except that the rare earth oxysulfide powders ($Lu_2O_2S$:Tb etc.) shown in Table 1 were used. Those X-ray-electric charge conversion films were measured for their sensitivity and dark current by the same procedure as that in Example 1. Additionally, planar X-ray detectors configured of the obtained X-ray-electric charge conversion films were measured for their properties and evaluated by the same procedures as those in Example 1. The evaluated results are shown in Table 1 and Table 2.

EXAMPLE 14

To $Tb_2O_2S$ powder having an average particle diameter of 9 μm were added 7% by mass of acrylic resin as a binder, 70% by mass of methyl isobutyl ketone (MIBK) as a solvent and 2.8% by mass of di-butyl phthalate as a plasticizing agent. They were mixed with alumina ball by a pot roller for 24 hours. The obtained slurry was dried and sieved with #60 sieve. The obtained powder was loaded in a mold and pressed under a pressure of about 18 MPa to produce a plate having a diameter of 35 mm and a thickness of 1.2 mm. The X-ray-electric charge conversion film of $Tb_2O_2S$ had an electric resistivity of $10^{12}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 15

To $Gd_2S_3$ powder having an average particle diameter of 7 μm was added 0.1% by mass of a titanate type coupling agent. After mixing, 3% by mass of epoxy resin was added and mixed as binder. The obtained compound was loaded in a mold and pressed under a pressure of about 10 MPa to produce a plate having a diameter of 35 mm and a thickness of 0.8 mm. Thus, the X-ray-electric charge conversion film was produced. The X-ray-electric charge conversion film of $Gd_2S_3$ had an electric resistivity of $10^{10}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 16

To $Tb_2O_3$ powder having an average particle diameter of 6 μm was added 0.1% by mass of a titanate type coupling agent. After mixing, 3% by mass of epoxy resin was added and mixed as binder. The obtained compound was loaded in a mold and pressed under a pressure of about 10 MPa to produce a plate having a diameter of 35 mm and a thickness of 0.7 mm. Thus, the X-ray-electric charge conversion film was produced. The X-ray-electric charge conversion film of $Tb_2O_3$ had an electric resistivity of $10^{12}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 17

To HoAlO$_3$ powder having an average particle diameter of 9 μm was added 0.1% by mass of a titanate type coupling agent. After mixing, 3% by mass of epoxy resin was added and mixed as binder. The obtained compound was loaded in a mold and pressed under a pressure of about 10 MPa to produce a plate having a diameter of 35 mm and a thickness of 0.6 mm. Thus, the X-ray-electric charge conversion film was produced. The X-ray-electric charge conversion film of HoAlO$_3$ had an electric resistivity of $10^{12}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 18

To La$_2$Se$_3$ powder having an average particle diameter of 7 μm was added 0.1% by mass of a titanate type coupling agent. After mixing, 3% by mass of epoxy resin was added and mixed as binder. The obtained compound was loaded in a mold and pressed under a pressure of about 10 MPa to produce a plate having a diameter of 35 mm and a thickness of 0.6 mm. Thus, the X-ray-electric charge conversion film was produced. The X-ray-electric charge conversion film of La$_2$Se$_3$ had an electric resistivity of $10^9$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 19

To EuTe powder having an average particle diameter of 13 μm was added 0.1% by mass of a titanate type coupling agent. After mixing, 3% by mass of epoxy resin was added and mixed as binder. The obtained compound was loaded in a mold and pressed under a pressure of about 10 MPa to produce a plate having a diameter of 35 mm and a thickness of 0.6 mm. Thus, the X-ray-electric charge conversion film was produced. The X-ray-electric charge conversion film of EuTe had an electric resistivity of $10^{11}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 20

Ce$_2$O$_3$ powder having an average particle diameter of 10 μm was shaped by a rubber press. The obtained shaped body was sealed in a capsule of Ta and undergone a HIP process. The HIP process was performed under conditions including a pressure of 147 MPa, a temperature of 1300° C. and three hours with argon gas sealed as pressure medium. Then, the Ce$_2$O$_3$ sintered body undergone the HIP process was used as target to form an X-ray-electric charge conversion film having a thickness of 200 μm by sputtering. The X-ray-electric charge conversion film of Ce$_2$O$_3$ had an electric resistivity of $10^{12}$ Ω·m. The properties of the X-ray-electric charge conversion film and those of the planar X-ray detector formed of it were measured and evaluated by the same procedures as those in Example 1. The evaluated results are shown in Table 1 and Table 2.

EXAMPLE 21

Figure 4:
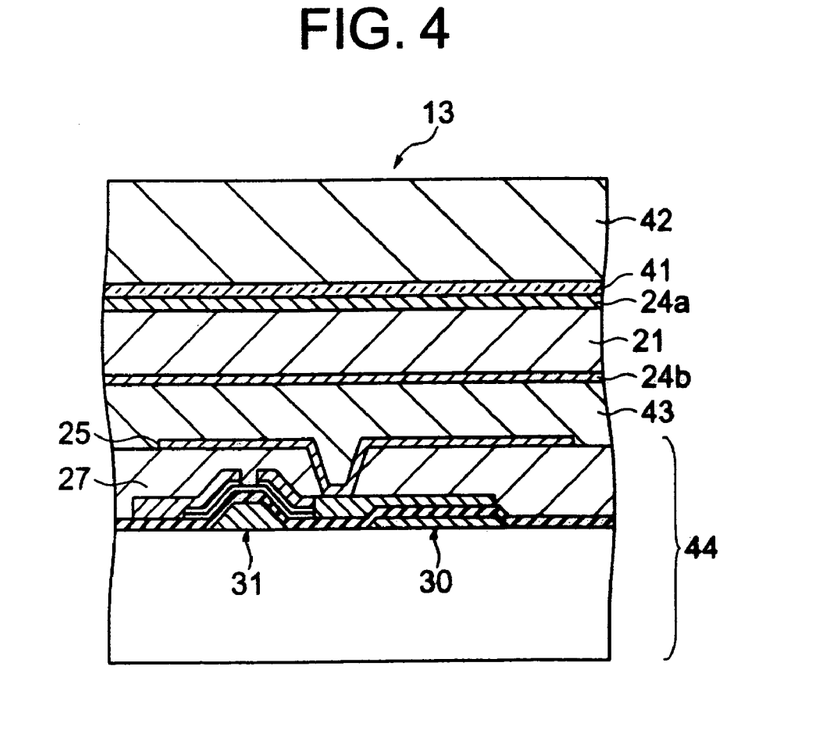
FIG. 4 is a sectional view showing a main portion of the X-ray detector which is applied in Example 21 of the present invention.

In this Example, the planar X-ray detector having the structure shown in FIG. 4 was produced. Cr electrodes 24a, 24b having a thickness of 200 nm were respectively formed by sputtering on the top and bottom surfaces of the Gd$_2$S$_3$ plate 21 having a thickness in a range of 100 to 1000 μm (preferably, 200 to 500 μm) produced by a rubber press method. The resultant plate was adhered to a glass substrate 42 by an epoxy adhesive (an adhesive agent layer 41). An organic conductive film 43 having a thickness of 20 μm was formed on the bottom side of the substrate by printing, and the resultant product was adhered to a TFT array substrate 44 to contact the organic conductive film 43 and the pixel electrode 25 of the TFT array substrate 44.

For the organic conductive film 43, a material selected from, for example, Alq$_3$, TPD, polyphenylene vinylene, polyalkyl thiophene, polyvinyl carbazole, triphenylene, liquid crystal molecules, metal phthalocyanine and the like can be used. The organic conductive film 43 is preferably adjusted to have a resistivity of $1 \times 10^4$ Ω·m or more in order to prevent resolution from degrading due to the transfer of signal electric charge to the adjacent pixels. The properties of the above-described X-ray-electric charge conversion film and those of the planar X-ray detector formed of it were measured and evaluated by the same procedures as those in Example 1. The evaluated results are shown in Table 1 and Table 2.

EXAMPLE 22

Figure 5:
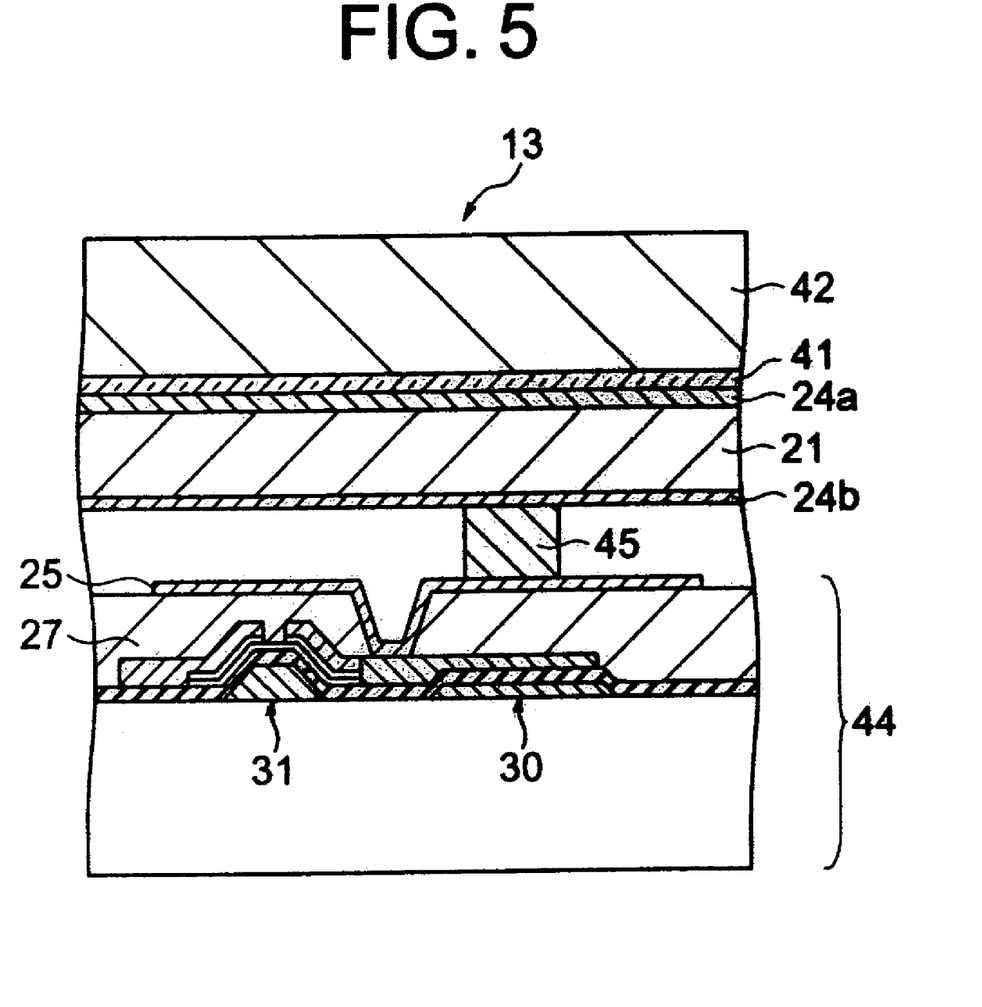
FIG. 5 is a sectional view showing a main portion of the X-ray detector which is applied in Example 22 of the present invention.

In this Example, the planar X-ray detector having the structure shown in FIG. 5 was produced. Al electrodes 24a, 24b having a thickness of 300 nm were respectively formed by sputtering on the top and bottom surfaces of the Tb$_2$O$_2$S plate 21 produced in the same manner as in Example 14. The resultant plate was adhered to the glass substrate 42 by using the epoxy adhesive agent layer 41. A cylindrical resin column 45 was formed on places corresponding to the individual pixels of the TFT array by having an acrylic photosensitive polymer containing black dye (or pigment) on the bottom of the resultant substrate, transferring a round pattern used for masking and developing.

The above-described substrate was adhered with the pixel electrode 25 of the TFT array substrate 44 and the resin column 45 aligned. Then, the resin was thermally cured by annealing at 200° C. The resin column 45 has a columnar shape having a diameter of 50 μm and a height of 20 μm. The properties of the above-described X-ray-electric charge conversion film and those of the planar X-ray detector formed of it were measured and evaluated by the same procedures as those in Example 1. The evaluated results are shown in Table 1 and Table 2.

COMPARATIVE EXAMPLE 1

PbI$_2$ powder having an average particle diameter of 10 μm was used to produce an X-ray-electric charge conversion film and a planar X-ray detector using it in the same manner as in Example 8. The properties of the X-ray-electric charge conversion film and those of the planar X-ray detector formed of it were measured and evaluated by the same procedures as those in Example 1. The evaluated results are shown in Table 1 and Table 2.

COMPARATIVE EXAMPLE 2

An amorphous Se film having a thickness of 300 μm was produced by sputtering and used as an X-ray-electric charge conversion film to produce a planar X-ray detector in the same manner as in Example 1. The properties of the X-ray-electric charge conversion film and those of the planar X-ray detector formed of it were measured and evaluated by the same procedures as those in Example 1. The evaluated results are shown in Table 1 and Table 2.

TABLE 1

| | X-ray-electric charge conversion film | | Sensitivity | Dark |
|---|---|---|---|---|
| | Constituent material | Resistivity ($\Omega \cdot m$) | ($pC/cm^2$)/ (nC/kg) | current ($pA/cm^2$) |
| Example 1 | $Gd_2O_2S$ | $10^{12}$ | 4.9 | 20 |
| Example 2 | $(Gd_{0.999}Tb_{0.001})_2O_2S$ | $10^{11}$ | 4.2 | 60 |
| Example 3 | $(Gd_{0.999}Pr_{0.001})_2O_2S$ | $10^{11}$ | 3.9 | 55 |
| Example 4 | $(Gd_{0.999}Eu_{0.001})_2O_2S$ | $10^{11}$ | 4.1 | 66 |
| Example 5 | $(Gd_{0.998}Tb_{0.002})_2O_2S$ | $10^{11}$ | 3.8 | 58 |
| Example 6 | $(Gd_{0.8}Lu_{0.2})_2O_2S$ | $10^{10}$ | 3.7 | 77 |
| Example 7 | $(Gd_{0.7}La_{0.3})_2O_2S$ | $10^{10}$ | 3.9 | 78 |
| Example 8 | $Lu_2O_2S$ | $10^{12}$ | 3.6 | 35 |
| Example 9 | $(Lu_{0.999}Tb_{0.001})_2O_2S$ | $10^{11}$ | 4.0 | 62 |
| Example 10 | $(Lu_{0.999}Pr_{0.001})_2O_2S$ | $10^{11}$ | 4.2 | 64 |
| Example 11 | $(Lu_{0.999}Eu_{0.001})_2O_2S$ | $10^{11}$ | 4.4 | 66 |
| Example 12 | $(Lu_{0.997}Pr_{0.003})_2O_2S$ | $10^{11}$ | 3.7 | 77 |
| Example 13 | $(Lu_{0.6}b_{0.4})_2O_2S$ | $10^{10}$ | 3.8 | 76 |
| Example 14 | $Tb_2O_2S$ | $10^{12}$ | 4.2 | 16 |
| Example 15 | $Gd_2S_3$ | $10^{10}$ | 3.8 | 78 |
| Example 16 | $Tb_2O_3$ | $10^{12}$ | 5.0 | 18 |
| Example 17 | $HoAlO_3$ | $10^{12}$ | 4.9 | 22 |
| Example 18 | $Lu_2Se_3$ | $10^9$ | 5.9 | 84 |
| Example 19 | $EuTe$ | $10^{11}$ | 5.1 | 56 |
| Example 20 | $Ce_2O_3$ | $10^{12}$ | 4.8 | 27 |
| Example 21 | $Gd_2S_3$ | $10^{10}$ | 3.7 | 77 |
| Example 22 | $Tb_2O_2S$ | $10^{12}$ | 4.3 | 16 |
| Comparative Example 1 | $PbI_2$ | — | 3.3 | 400 |
| Comparative Example 2 | a-Se | — | 1.2 | 110 |

TABLE 2

| | X-ray-electric charge conversion film | Relative sensitivity | Relative sharpness |
|---|---|---|---|
| Example 1 | $Gd_2O_2S$ | 416 | 102 |
| Example 2 | $(Gd_{0.999}Tb_{0.001})_2O_2S$ | 356 | 102 |
| Example 3 | $(Gd_{0.999}Pr_{0.001})_2O_2S$ | 334 | 105 |
| Example 4 | $(Gd_{0.999}Eu_{0.001})_2O_2S$ | 351 | 103 |
| Example 5 | $(Gd_{0.998}Tb_{0.002})_2O_2S$ | 320 | 103 |
| Example 6 | $(Gd_{0.8}Lu_{0.2})_2O_2S$ | 318 | 102 |
| Example 7 | $(Gd_{0.7}La_{0.3})_2O_2S$ | 327 | 108 |
| Example 8 | $Lu_2O_2S$ | 304 | 103 |
| Example 9 | $(Lu_{0.999}Tb_{0.001})_2O_2S$ | 347 | 105 |
| Example 10 | $(Lu_{0.999}Pr_{0.001})_2O_2S$ | 355 | 106 |
| Example 11 | $(Lu_{0.999}Eu_{0.001})_2O_2S$ | 370 | 106 |
| Example 12 | $(Lu_{0.997}Pr_{0.003})_2O_2S$ | 315 | 102 |
| Example 13 | $(Lu_{0.6}b_{0.4})_2O_2S$ | 328 | 107 |
| Example 14 | $Tb_2O_2S$ | 351 | 105 |
| Example 15 | $Gd_2S_3$ | 322 | 106 |
| Example 16 | $Tb_2O_3$ | 420 | 107 |
| Example 17 | $HoAlO_3$ | 417 | 109 |
| Example 18 | $Lu_2Se_3$ | 315 | 104 |
| Example 19 | $EuTe$ | 330 | 105 |
| Example 20 | $Ce_2O_3$ | 378 | 109 |
| Example 21 | $Gd_2S_3$ | 316 | 108 |
| Example 22 | $Tb_2O_2S$ | 359 | 104 |
| Comparative Example 1 | $PbI_2$ | 280 | 102 |
| Comparative Example 2 | a-Se | 100 | 100 |

As shown in Table 1 and Table 2, it is seen that the X-ray-electric charge conversion films using the rare earth compound have excellent sensitivity to X-rays and also have a small dark current. It is seen that the planar X-ray detectors and X-ray imaging systems using the above X-ray-electric charge conversion films excel in both sensitivity and sharpness in comparison with those in Comparative Example 1 and Comparative Example 2 using a conventional X-ray-electric charge conversion film. The X-ray-electric charge conversion films used in individual Examples and Comparative Examples had an impurity amount of 1% by mass or less.

INDUSTRIAL APPLICABILITY

The X-ray detector of the present invention does not adversely affect on human bodies and environments, has excellent sensitivity to X-rays and applies the X-ray-electric charge conversion film which can be obtained as a uniform film. Accordingly, the X-ray detector which is provided with the improved X-ray detection sensitivity, detection accuracy and the like with environmental loads and the like decreased can be provided. The X-ray examination apparatus using the X-ray detector can increase examination information and improve examination accuracy and the like, so that it is effectively used for medical diagnosis, various kinds of non-destructive inspection and the like.

What is claimed is:

1. An X-ray detector, comprising:
    an X-ray-electric charge conversion film which directly converts an incident X-ray into an electric charge and consists essentially of a rare earth compound containing at least one of rare earth element and at least one of element selected from oxygen, sulfur, selenium and tellurium; and
    a charge information reading section which has plural pixels in contact with the X-ray-electric charge conversion film and reads as an image signal the electric charge generated in the X-ray-electric charge conversion film for each of the plural pixels.

2. An X-ray detector according to claim 1,
    wherein the rare earth compound is at least one selected from rare earth oxide, rare earth sulfide and rare earth oxysulfide.

3. An X-ray detector according to claim 1,
    wherein the rare earth element is at least one selected from Y, La, Ce, Pr, Nd, Sm, Eu, Gd, Tb, Ry, Ho, Er, Tm, Yb and Lu.

4. An X-ray detector according to claim 1,
    wherein the rare earth element is at least one selected from Eu, Gd, Tb, Dy, Ho, Er, Tm, Yb and Lu.

5. An X-ray detector according to claim 1,
    wherein the rare earth compound has a band gap in a range of 1.7 to 6.0 eV.

6. An X-ray detector according to claim 1,
    wherein the X-ray-electric charge conversion film has an electric resistivity in a range of $10^8$ to $10^{15}$ $\Omega \cdot m$.

7. An X-ray detector according to claim 1,
    wherein the X-ray-electric charge conversion film has a sintered body of the rare earth compound.

8. An X-ray detector according to claim 1,
    wherein the X-ray-electric charge conversion film has a thin film of the rare earth compound.

9. An X-ray detector according to claim 1,
    wherein the plural pixels each have a pixel electrode, an electric charge storage capacitor which accumulates the electric charges generated in the X-ray-electric charge conversion film via the pixel electrode, and a switching element which is disposed in correspondence with the electric charge storage capacitor and reads the electric charge.

10. An X-ray detector according to claim 1,
wherein the X-ray detector is a planar X-ray detector which has the plural pixels arranged in the shape of an array.

11. An X-ray examination apparatus, comprising:
an X-ray source which emits an X-ray to a subject; and
the X-ray detector according to claim 1 which detects as an image signal the X-ray passed through the subject.

12. An X-ray examination apparatus according to claim 11, further comprising:
a signal processing section which digitally processes the image signal detected by the X-ray detector; and
a display section which displays the digitally processed image signal as an X-ray image.

13. An X-ray examination, apparatus according to claim 11,
wherein the X-ray detector is a planar X-ray detector which has the plural pixels arranged in the shape of an array.

14. An X-ray detector, comprising:
an X-ray-electric charge conversion film which directly converts an incident X-ray into an electric charge and consists essentially of at least one of rare earth compound selected from rare earth oxide, rare earth sulfide, rare earth sulfide, rare earth telluride, rare earth oxysulfide, rare earth oxyselenide, rare earth oxytelluride, rare earth silicate, rare earth aluminate, rare earth phosphate and rare earth borate.
a charge information reading section which has plural pixels in contact with the X-ray-electric charge conversion film and reads as an image signal the electric charge generated in the X-ray-electric charge conversion film for each of the plural pixels.

15. An X-ray detector according to claim 14,
wherein the rare earth element is at least one selected from Y, La, Ce, Pr, Nd, Sm, Eu, Gd, Tb, Dy, Ho, Er, Tm, Yb and Lu.

16. An X-ray detector according to claim 14,
wherein the rare earth compound has a band gap in a range of 1.7 to 6.0 eV.

17. An X-ray detector according to claim 14,
wherein the X-ray-electric charge conversion film has an electric resistivity in a range of $10^8$ to $10^{15}$ Ω·m.

18. An X-ray detector according to claim 14,
wherein the X-ray-electric charge conversion film has a sintered body of the rare earth compound.

19. An X-ray detector according to claim 14,
wherein the X-ray-electric charge conversion film has a thin film of the rare earth compound.

20. An X-ray detector according to claim 14,
wherein the X-ray detector is a planar X-ray detector which has the plural pixels arranged in the shape of an array.

21. An X-ray examination apparatus, comprising:
an X-ray source which emits an X-ray to a subject; and
the X-ray detector according to claim 14 which detects as an image signal the X-ray passed through the subject.

22. An X-ray examination apparatus according to claim 21, further comprising:
a signal processing section which digitally processes the image signal detected by the X-ray detector; and
a display section which displays the digitally processed image signal as an X-ray image.

23. An X-ray examination apparatus according to claim 21,
wherein the X-ray detector is a planar X-ray detector which has the plural pixels arranged in the shape of an array.

24. An X-ray detector, comprising:
an X-ray-electric charge conversion film which directly converts an incident X-ray into an electric charge and consists essentially of (i) a rare earth compound which contains at least one of rare earth element and at least one of element selected from oxygen, sulfur, selenium and tellurium and (ii) a binder component; and
a charge information reading section which has plural pixels in contact with the X-ray-electric charge conversion film and reads as an image signal the electric charge generated in the X-ray-electric charge conversion film for each of the plural pixels.

25. An X-ray detector according to claim 24,
wherein the X-ray-electric charge conversion film has a sheet-shaped formed body containing the rare earth compound and the binder component.

26. An X-ray detector according to claim 24,
wherein the X-ray-electric charge conversion film has a film body containing the rare earth compound and the binder component coated onto a support.

27. An X-ray detector according to claim 24,
wherein the rare earth compound is at least one selected from rare earth oxide, rare earth sulfide and rare earth oxysulfide.

28. An X-ray detector according to claim 24,
wherein the rare earth element is at least one selected from Y, La, Ce, Pr, Nd, Sm, Eu, Gd, Tb, Dy, Ho, Er, Tv, Yb and Lu.

29. An X-ray detector according to claim 24,
wherein the rare earth compound has a band gap in a range of 1.7 to 6.0 eV.

30. An X-ray detector according to claim 24,
wherein the X-ray-electric charge conversion film has an electric resistivity in a range of $10^8$ to $10^{15}$ Ω·m.

31. An X-ray detector according to claim 24,
wherein the X-ray detector is a planar X-ray detector which has the plural pixels arranged in the shape of an array.

32. An X-ray examination apparatus, comprising:
an X-ray source which emits an X-ray to a subject; and
the X-ray detector according to claim 24 which detects as an image signal the X-ray passed through the subject.

33. An X-ray examination apparatus according to claim 32, further comprising:
a signal processing section which digitally processes the image signal detected by the X-ray detector; and
a display section which displays the digitally processed image signal as an X-ray image.

34. An X-ray examination apparatus according to claim 32,
wherein the X-ray detector is a planar X-ray detector which has the plural pixels arranged in the shape of an array.

* * * * *